US011885256B2

(12) United States Patent
Barciela Díaz-Blanco et al.

(10) Patent No.: US 11,885,256 B2
(45) Date of Patent: Jan. 30, 2024

(54) METHOD FOR OPERATING AN INTERNAL COMBUSTION ENGINE (71) Applicant: MAN Truck & Bus SE, Munich (DE)

(72) Inventors: Bruno Barciela Díaz-Blanco, Munich (DE); Thomas Malischewski, Heilsbronn (DE); Steffen Hirschmann, Neustadt an der Aisch (DE); Dominic Hyna, Fürth (DE); Daniel Zülow, Munich (DE)

(73) Assignee: MAN TRUCK & BUS SE, Munich (DE)

( * ) Notice: Subject to any disclaimer, the term of this patent is extended or adjusted under 35 U.S.C. 154(b) by 269 days.

(21) Appl. No.: 17/602,707

(22) PCT Filed: Mar. 16, 2020

(86) PCT No.: PCT/EP2020/057105
§ 371 (c)(1),
(2) Date: Apr. 15, 2022

(87) PCT Pub. No.: WO2020/207712
PCT Pub. Date: Oct. 15, 2020

(65) Prior Publication Data
US 2022/0307412 A1 Sep. 29, 2022

(30) Foreign Application Priority Data
Apr. 11, 2019 (DE) .................. 10 2019 109 603.0

(51) Int. Cl.
F02B 43/00 (2006.01)
F02B 43/12 (2006.01)
(Continued)

(52) U.S. Cl.
CPC .............. F02B 43/12 (2013.01); F02B 19/00 (2013.01); F02D 19/024 (2013.01);
(Continued)

(58) Field of Classification Search
CPC .. F02D 41/0027; F02D 41/402; F02D 41/403; F02D 19/022; F02D 19/024;
(Continued)

(56) References Cited

U.S. PATENT DOCUMENTS 2,799,255 A * 7/1957 Gehres ............... F02M 21/0269
123/1 R
6,935,284 B2 * 8/2005 Qian ....................... F02B 43/10
123/3

(Continued)

FOREIGN PATENT DOCUMENTS

AT 6290 U1 7/2003
DE 4419429 A1 12/1995
(Continued)

OTHER PUBLICATIONS

German Search Report issued in German Patent Application No. 102019109603.0 dated Nov. 29, 2019. No English translation available.

(Continued)

Primary Examiner — Phutthiwat Wongwian
Assistant Examiner — Sherman D Manley
(74) Attorney, Agent, or Firm — Weber Rosselli & Cannon LLP (57) ABSTRACT A method for operating an internal combustion engine including feeding a pilot quantity of gas fuel, into a prechamber before a piston reaches a top dead center position. The method comprises autoignition of the pilot quantity of gas fuel in the prechamber, feeding a main quantity of gas fuel into the prechamber after the autoignition, and ignition of the main quantity of gas fuel by the conditions in the prechamber that are brought about by the autoignited pilot quantity. The method makes it possible to operate an internal combustion engine purely with methane or some other (Continued)

gaseous fuel, by means of compression autoignition of the pilot quantity.

20 Claims, 4 Drawing Sheets (51) Int. Cl.
*F02B 19/00* (2006.01)
*F02D 19/02* (2006.01)
*F02M 21/02* (2006.01)

(52) U.S. Cl.
CPC .... *F02M 21/0209* (2013.01); *F02M 21/0254* (2013.01); *F02B 2019/006* (2013.01)

(58) Field of Classification Search
CPC ........... F02M 21/0209; F02M 21/0215; F02M 21/0248; F02M 21/0254; F02M 51/061; F02P 19/02; F02B 19/12; F02B 19/14; F02B 19/18; F02B 19/1014; F02B 19/10; F02B 19/108; F02B 19/1085; F02B 2019/002; F02B 2019/006; Y02T 10/12; Y02T 10/30
See application file for complete search history.

(56) References Cited

U.S. PATENT DOCUMENTS

| | | | | |
|---|---|---|---|---|
| 9,822,692 | B2* | 11/2017 | Könczöl | F02B 43/00 |
| 9,890,689 | B2* | 2/2018 | Hampson | F02D 41/3005 |
| 9,903,264 | B1* | 2/2018 | Yeager | F02D 35/023 |
| 11,078,826 | B1* | 8/2021 | Chang | F02M 21/0275 |
| 2003/0116121 | A1* | 6/2003 | Agama | F02B 1/12 |
| | | | | 123/259 |
| 2003/0196634 | A1* | 10/2003 | Lausch | F02B 19/12 |
| | | | | 123/275 |
| 2015/0020769 | A1* | 1/2015 | Huang | F02M 61/1813 |
| | | | | 123/145 R |
| 2015/0369177 | A1* | 12/2015 | Coldren | F02M 51/0603 |
| | | | | 123/294 |
| 2015/0369192 | A1* | 12/2015 | Ge | F02M 45/086 |
| | | | | 239/584 |
| 2016/0017845 | A1* | 1/2016 | Huang | F02M 21/0221 |
| | | | | 123/495 |
| 2016/0326970 | A1* | 11/2016 | Fei | F02D 19/0694 |
| 2016/0348570 | A1* | 12/2016 | Willi | F02B 19/12 |
| 2017/0166289 | A1* | 6/2017 | Dahlberg | F01N 3/208 |
| 2017/0284320 | A1* | 10/2017 | Holst | F02D 41/0027 |
| 2017/0306917 | A1* | 10/2017 | Kim | F02M 26/44 |
| 2018/0038269 | A1* | 2/2018 | Willi | F02D 41/3005 |
| 2018/0142632 | A1* | 5/2018 | Martin | F02M 21/0263 |

FOREIGN PATENT DOCUMENTS

| | | |
|---|---|---|
| DE | 102014005984 A1 | 10/2015 |
| DE | 102015202193 A1 | 8/2016 |
| EP | 3043049 A1 | 7/2016 |
| JP | 2018066369 A | 4/2018 |
| WO | 2018141589 A1 | 8/2018 |

OTHER PUBLICATIONS

PCT Search Report and Written Opinion issued in PCT Application No. PCT/EP2020/057105 dated Jun. 25, 2020. English translation not available.

* cited by examiner

METHOD FOR OPERATING AN INTERNAL COMBUSTION ENGINE

CROSS-REFERENCE TO RELATED APPLICATIONS

This application is a 371 application of PCT/EP2020/057105 filed Mar. 16, 2020, which claims benefit of and priority to German Patent Application Serial No. DE102019109603.0 filed Apr. 11, 2019, the disclosures of the above-identified applications are hereby incorporated by reference in their entirety.

BACKGROUND

The disclosure relates to a method for operating an internal combustion engine, for example a single-fuel internal combustion engine, with a gas fuel. The disclosure furthermore relates to an internal combustion engine and to a motor vehicle having an internal combustion engine.

The "HPDI" (High Pressure Direct Injection) method can be used to operate a gas-fuel internal combustion engine. In this combustion method, methane is required as a gas fuel and diesel as a liquid fuel. In this case, the methane and the diesel are conveyed separately in an injector. First of all, a pilot mass of about 3 mg to 10 mg of diesel is injected in the region of the top dead center. Owing to the properties of the diesel (low ignition temperatures), immediate combustion takes place. This results in a local, distinct temperature increase. In the second step, the main quantity of methane is then injected. Owing to the previous temperature increase, immediate combustion of the methane also takes place.

One disadvantage of this process may be the continued requirement for diesel fuel, giving rise to a significant increase in system complexity and preventing the full 002-saving potential from being raised.

SUMMARY

The disclosure is directed to providing an alternative or improved technique for operating an internal combustion engine with a gas fuel.

The disclosure provides a method for operating an internal combustion engine, for example a single-fuel internal combustion engine. The method comprises compressing supplied air in a main combustion chamber and a prechamber (precombustion chamber) of the internal combustion engine by moving a piston in the main combustion chamber to a top dead center position of a piston movement of the piston. The method comprises feeding a pilot quantity of gas fuel (gaseous fuel), for example methane (natural gas), into the prechamber before the piston reaches the top dead center position. The method comprises autoignition of the pilot quantity of gas fuel in the prechamber. The method comprises feeding a main quantity of gas fuel into the prechamber after the autoignition. And ignition of the main quantity of gas fuel by the conditions in the prechamber that are brought about by the autoignited pilot quantity.

The disclosure makes it possible to operate an internal combustion engine purely with methane or some other gaseous fuel, more specifically by means of compression autoignition of the pilot quantity. No diesel fuel or the like is required for igniting the gas fuel, as with the HPDI method. The autoignition of the pilot quantity leads to an increase in temperature and pressure in the prechamber. The main quantity of gas fuel fed in thereafter can thereby be ignited. The main combustion itself may correspond to or be similar to a diesel combustion process.

The main quantity can expediently be fed in after and at a distance from the pilot quantity.

In one exemplary embodiment, compression takes place at a compression ratio greater than or equal to about 20, 21, 22 or 23. It has been found that, in the given system with a prechamber and a main combustion chamber, an ignition temperature of methane can be achieved relatively reliably in the prechamber at a compression ratio of about 23, more specifically significantly before the piston reaches top dead center in the compression cycle and for all load situations of the internal combustion engine.

In a further exemplary embodiment, the pilot quantity results from a pilot mass of gas fuel of between about 0.5 mg and about 3 mg, or between about 0.5 mg and about 2 mg. It has been found that this minute quantity of gas fuel may be sufficient to ensure reliable autoignition of the pilot quantity.

In a further exemplary embodiment, the pilot quantity is selected in such a way that a combustion air ratio of between about 0.5 and about 1.6 is established in the prechamber. As a result, there is the possibility of a combustible mixture which can ignite spontaneously being present in the prechamber.

In one embodiment, the feeding of the pilot quantity is carried out for a period of time of between about 50 μs and about 200 μs. It has been found that even this short period of time may be sufficient to feed in the small pilot quantity. The short time window permits particularly ac-curate attainment of a desired ignition point.

In a further embodiment, the feeding of the pilot quantity is carried out in a range between about 40° of crank angle before top dead center and about 10° of crank angle before top dead center. It has been found that this crank angle range is particularly suitable. On the one hand, good mixing between the pilot quantity and the compressed air can take place. On the other hand, the autoignition and the subsequent exothermic reaction take place at a point in time before the main quantity is fed in. At the time when the main quantity is fed in, conditions which are sufficient to ignite the main quantity are therefore already present in the prechamber.

In a variant embodiment, the feeding of the main quantity is carried out in a range between about 10° of crank angle before top dead center and about 25° of crank angle after top dead center. Combustion of the gas fuel which is approximated to or similar to the diesel process can thus take place in the expansion cycle.

In a further variant embodiment, the feeding of the pilot quantity and/or the feeding of the main quantity take/takes place with a feed pressure in a range between about 200 bar and about 600 bar. Reliable and rapid feeding of the gas fuel can thus be achieved even at very high final compression pressures, being brought about, for example, by the comparatively high compression ratio.

The pilot quantity and/or the main quantity are/is expediently fed directly into the prechamber, for example being blown in.

In one exemplary embodiment, the feeding of the pilot quantity and/or the feeding of the main quantity are/is performed by a piezoelectric fuel injector. In comparison with the HPDI combustion method mentioned at the outset, there is no medium for controlling a conventional magnetic injector owing to the omission of diesel fuel. In principle, it would also be possible to operate a solenoid valve actuator with compressed gas fuel, but this can result in very high leakage and spill quantities. It is therefore proposed to use a piezoelectric fuel injector. In this case, the needle movement can be controlled only via a piezoelectric element of the piezoelectric fuel injector, for example, and no spill losses of gas fuel occur. A further advantage of the piezoelectric fuel injector can be the possibility of micro-quantity control. The piezoelectric fuel injector can make it possible to produce very short feed durations of, for example, 50 μs to 200 μs and thus also very small feed quantities of, for example, 0.5 mg to 3 mg in a very stable manner.

In another exemplary embodiment, the feeding of the pilot quantity and/or the feeding of the main quantity are/is performed by a fuel injector actuated by means of an electromagnet.

In a further exemplary embodiment, the method further comprises adapting the pilot quantity and/or adapting a feed time of the pilot quantity as a function of a boost pressure of the air fed in. The pilot quantity can be adapted in such a way, for example, that a combustion air ratio A of between about 0.5 and about 1.6 is established in the prechamber. The pilot quantity can be advanced in the case of a high load or high boost pressure, for example.

In one embodiment, an inner side surface of the prechamber has a thermal insulator, for example in the form of a thermally insulating coating. The thermal insulator can minimize heat transfer between the prechamber and the gas fuel.

In a further embodiment, the step of autoignition of the pilot quantity of gas fuel in the prechamber is carried out during normal operation of the internal combustion engine (for example at idle, under partial load and/or under full load). In normal operation, no spark plug or glow plug is expediently used for igniting or supporting ignition of the pilot quantity.

In one variant embodiment, the method further comprises applied ignition of the pilot quantity in the prechamber by a spark plug in the case of a cold start of the internal combustion engine. Alternatively, the method may comprise, for example, preheating of the prechamber by means of a glow plug and autoignition of the pilot quantity of gas fuel in the preheated prechamber, for example in the case of a cold start of the internal combustion engine. In this way, reliable ignition of the gas fuel can be ensured even under cold-start conditions.

In a further variant embodiment, the feeding of the pilot quantity and/or the feeding of the main quantity take/takes place in gaseous form and/or are/is performed by the same fuel injector, expediently via the same line of the fuel injector.

In one exemplary embodiment, the prechamber has a volume in a range between about 0.5 cm$^3$ and approximately 2 cm$^3$. Such a small volume may be sufficient to bring about reliable autoignition of the very small pilot quantity of gas fuel together with the compressed air.

In a further exemplary embodiment, the prechamber is connected to the main combustion chamber by a plurality of through openings, for example 6 to 14 distributed through openings.

In a further exemplary embodiment, the prechamber is integrated into a fuel injector for the pilot quantity and/or the main quantity, or the prechamber is formed separately from a fuel injector for the pilot quantity and/or the main quantity.

The disclosure also relates to an internal combustion engine which is embodied for carrying out a method as disclosed herein.

The disclosure also relates to a motor vehicle, for example a commercial vehicle (e.g., a truck or bus), having an internal combustion engine which is embodied for carrying out a method as disclosed herein.

The internal combustion engine can expediently have a for example electronic control unit which is set up to carry out the method.

The term "control unit" can refer to electronics (e.g., with microprocessor(s) and data memory) which can take over open-loop control tasks and/or closed-loop control tasks, depending on the configuration. Even if the term "control" is used herein, "closed-loop control" or "feedback control" can thus also expediently be included, as it were.

It is also possible to use the method and device as disclosed herein for passenger cars, large engines, off-road vehicles, stationary engines, marine engines, etc.

The embodiments and features of the disclosure which are described above can be combined in any desired way.

BRIEF DESCRIPTION OF THE DRAWINGS

Further details and advantages of the disclosure are described below with reference to the appended drawings, in which.

DETAILED DESCRIPTION

The embodiments shown in the figures partially coincide, and therefore similar or identical parts are provided with the same reference signs and attention is also drawn, for the explanation thereof, to the description of the other embodiments or figures in order to avoid repetition.

Figure 1:
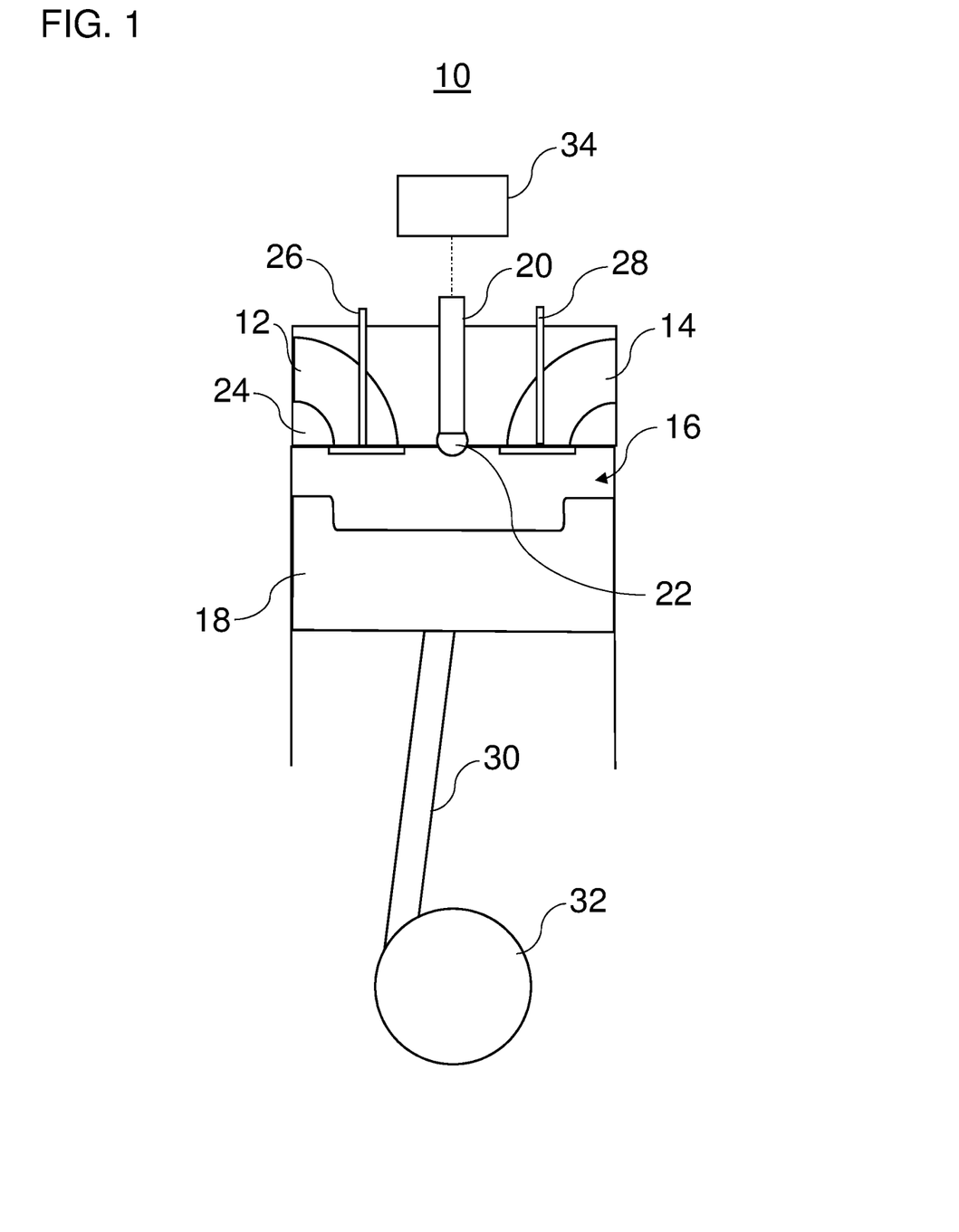
FIG. 1 shows a schematic illustration of an internal combustion engine according to one exemplary embodiment of the present disclosure.

FIG. 1 shows an internal combustion engine 10. The internal combustion engine 10 is embodied as a reciprocating piston internal combustion engine. The internal combustion engine 10 is expediently designed as a four-stroke internal combustion engine. The internal combustion engine 10 has one or more cylinders. In order to improve clarity, only one cylinder is illustrated in FIG. 1. As a particular preference, the internal combustion engine 10 is embodied as a single-fuel internal combustion engine for operation by means of methane (natural gas) as the only fuel. However, it is also possible, for example, for the internal combustion engine 10 to be operated with some other gaseous fuel, e.g. hydrogen.

The internal combustion engine 10 may be included in a vehicle, e.g., a motor vehicle, a rail vehicle, or a watercraft, for propelling the vehicle. The internal combustion engine 10 is for example included in a commercial vehicle, e.g., a truck or bus, for driving the commercial vehicle. It is also possible to use the internal combustion engine 10 in a stationary installation, for example for driving a generator.

The internal combustion engine 10 has at least one air inlet passage 12, at least one exhaust gas outlet passage 14, a main combustion chamber 16, a piston 18, a fuel injector 20, a prechamber (precombustion chamber) 22, and a cylinder head 24 for each cylinder.

The air inlet passage 12 opens into the main combustion chamber 16. Via the air inlet passage 12, (charging) air can be fed to the main combustion chamber 16. The air inlet passage 12 is arranged in the cylinder head 24. The cylinder head 24 delimits the main combustion chamber 16 from above. An air feed system can be arranged upstream of the air inlet passage 12. Depending on requirements, the air feed system can have one or more compressors of a turbocharger assembly, a charge air cooler and/or an exhaust gas recirculation line, for example.

An orifice of the air inlet passage 12 into the main combustion chamber 16 can be opened and closed by means of an air inlet valve 26. The air inlet valve 26 is for example designed as a poppet valve. The air inlet valve 26 can be actuated by means of any technology, e.g. by means of an expediently variable valve drive.

After combustion, the exhaust gas leaves the main combustion chamber 16 through the exhaust gas outlet passage 14 opened by means of an exhaust gas outlet valve 28. The exhaust gas outlet valve 28 may be designed as a poppet valve, for example. The exhaust gas outlet passage 14 is arranged in the cylinder head 24. An exhaust system can be arranged down-stream of the exhaust gas outlet passage 14. The exhaust system can have one or more exhaust turbines of a turbocharger assembly and/or at least one exhaust gas aftertreatment device, for example.

The piston 18 is arranged so as to be movable back and forth in the cylinder. The piston 18 is connected to a crankshaft 32 via a connecting rod 30. The piston 18 delimits the main combustion chamber 16 at the bottom. The piston 18 can compress air in the main combustion chamber 16 as it moves from bottom dead center to top dead center. During this process, the compression ratio c can be comparatively high. The compression ratio c can be 23 or greater, for example.

The fuel injector 20 is designed as a gas fuel injector, for example a methane injector. The fuel injector 20 is designed as a single-fuel injector for conveying a single fuel. The fuel injector 20 is arranged or embodied in such a way that gas fuel is fed into the prechamber 22. The fuel injector 20 may inject the gas fuel in gaseous form into the prechamber 22. The fuel injector 20 is expediently arranged centrally with respect to the main combustion chamber 16.

Feeding by means of the fuel injector 20 expediently takes place at a high pressure, for example in a range between 200 bar and 600 bar. By way of example, the fuel injector 20 may be fluidically connected to a gas fuel common rail. The gas fuel common rail can feed gas fuel to the fuel injector 20.

The fuel injector 20 is designed to feed a pilot quantity and a main quantity of gas fuel into the prechamber 22 at different times. The fuel injector 20 may be actuated in any manner. In order to also allow very small quantities of gas fuel to be fed in, the fuel injector 20 is for example a piezoelectric fuel injector, which can be actuated by means of a piezoelectric element. For example, a closure needle of the fuel injector 20 can be raised or lowered as a function of a state of a piezoelectric element or piezoelectric crystal of the fuel injector 20. It is also possible, for example, for the fuel injector 20 to be actuated by means of an electromagnet. Actuation of the fuel injector 20 is expediently controlled by an electronic control unit 34.

Figure 2:
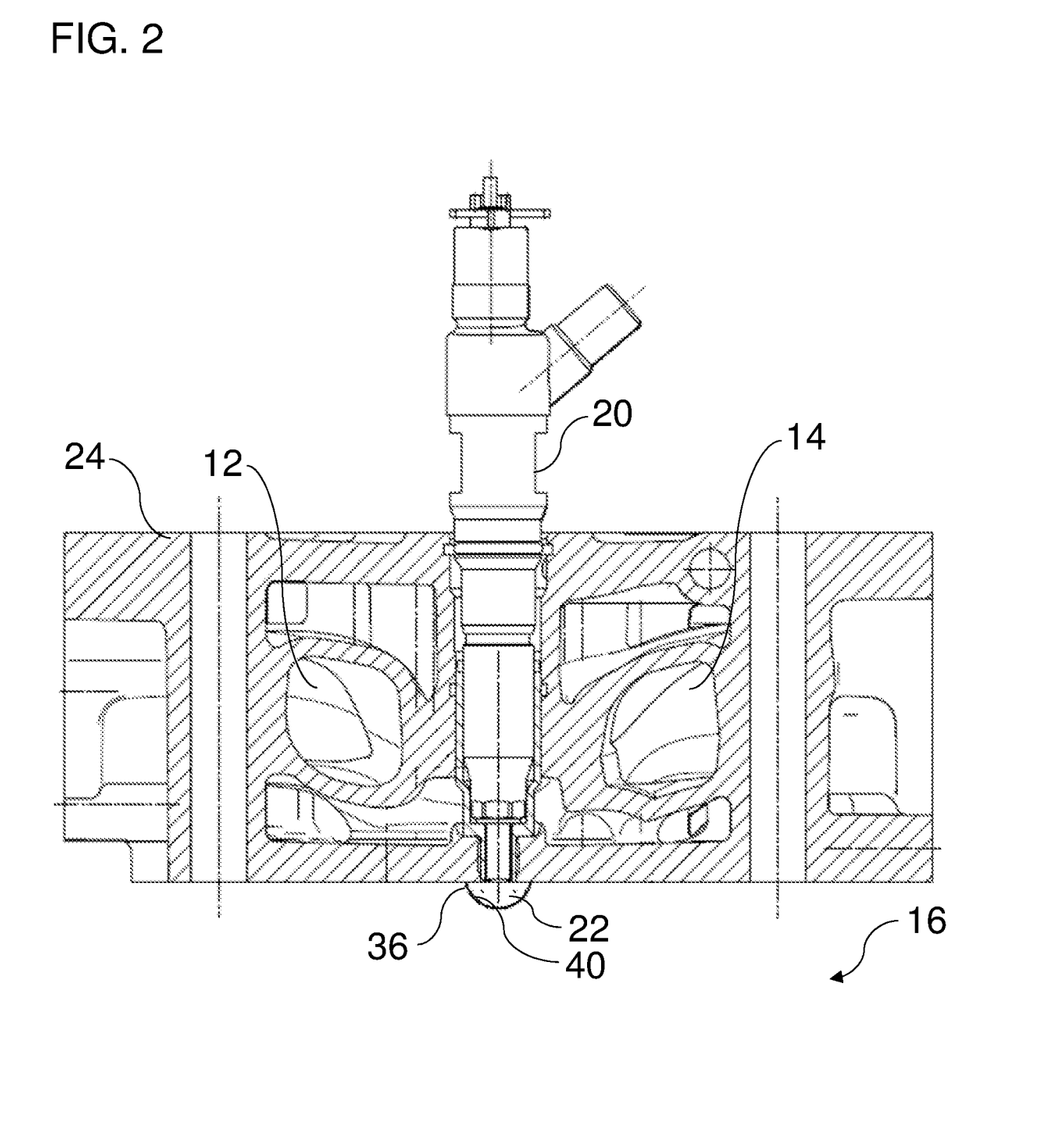
FIG. 2 shows a sectional view through an illustrative cylinder head.

The prechamber 22 may be integrated into the fuel injector 20, as indicated in FIG. 1. However, it is also possible to form the prechamber 22 separately from the fuel injector 20, as shown in FIG. 2. The fuel injector 20 can then open directly into the prechamber 22, for example. If the prechamber 22 and the fuel injector 20 are formed separately, the prechamber can be formed at least partially by the cylinder head 24, by a cap element 36 (see FIG. 2) attached to the combustion chamber side of the cylinder head 24, and/or by a mounting sleeve 38 (see FIG. 2) for the fuel injector 20, for example. When the cap element 36 is used, it can be screwed into the mounting sleeve 38 from below, for example.

The prechamber 22 may, for example, have a spherical, dome-shaped or rounded internal volume. The gas fuel can be fed into the internal volume by means of the fuel injector 20. The internal volume can expediently be in a range between 0.5 cm$^3$ and 2.5 cm$^3$.

The prechamber 22 is in fluid communication with the main combustion chamber 16 via a plurality of through openings. The through openings are expediently arranged in a manner distributed symmetrically around a circumference of the prechamber 22. Six to fourteen through openings are included, for example.

It is possible that an inner side surface of the prechamber 22 has a thermal insulator 40. The thermal insulator 40 can expediently be embodied as a coating of the inner side surface. The thermal insulator 40 may consist of a ceramic material, for example. It is possible that the thermal insulator 40 is vapor-deposited on the inner side surface, for example, is applied to the inner side surface by means of plasma application, or is sprayed onto the inner side surface by means of a spraying method. The thermal insulator 40 can prevent or at least reduce cooling of gas fuel in the prechamber 22 by walls of the prechamber 22.

In an inlet cycle, air is fed through the air inlet passage 12 and the opened air inlet valve 26 into the main combustion chamber 16. The piston 18 moves from top dead center to bottom dead center. In the compression cycle, the air fed in is compressed in the main combustion chamber 16 with a high compression ratio (e.g. c 23). During this process, the air is also compressed in the prechamber 22. The piston 18 moves from bottom dead center to top dead center. During the compression cycle, the air is forced into the prechamber 22 by the piston 18 owing to the compression. In the compression cycle, a pressure and a temperature in the prechamber 22 increase.

Figure 3:
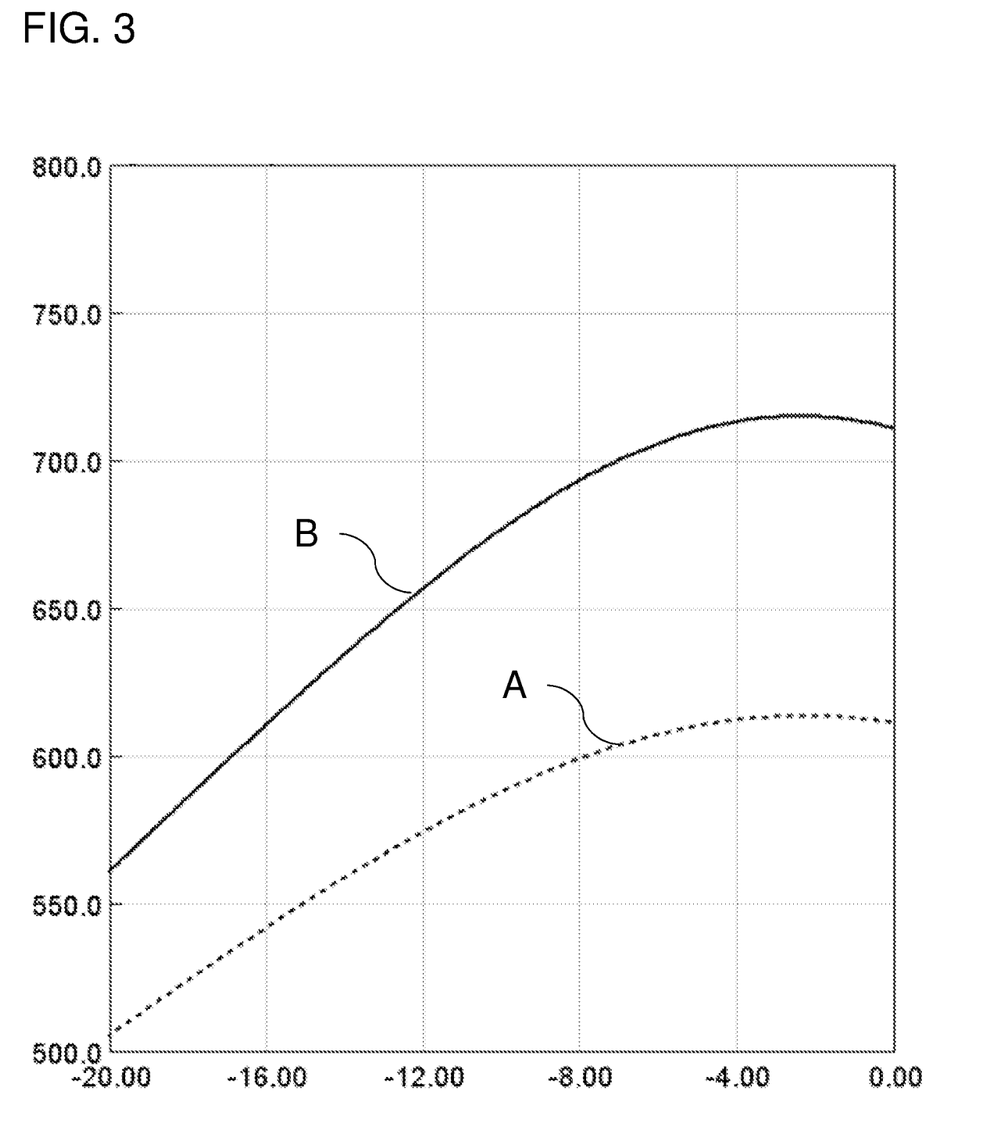
FIG. 3 shows a crank angle/temperature diagram for idling and two different compression ratios.

FIG. 3 shows an illustrative crank angle/temperature diagram for the prechamber 22 for two different compression ratios c when the internal combustion engine 10 is idling. The crank angle of the crankshaft 32 is shown on the abscissa. The temperature in the prechamber 22 is shown on the ordinate.

A first temperature curve A (dashed curve in FIG. 3) is obtained at a compression ratio of $\varepsilon=16$. A second temperature curve B (solid curve in FIG. 4) is obtained at a compression ratio of $\varepsilon=23$. It is obvious that the final compression temperature rises with a higher compression ratio. Furthermore, it can be seen that, at a compression ratio of $\varepsilon=23$, an ignition temperature of methane (about 640° C.) is achieved significantly before top dead center (0° of crank angle), even at idle. At a compression ratio of $\varepsilon=23$, it is therefore possible to generate autoignition conditions for methane in the prechamber 22 before the piston 18 reaches the top dead center position.

Figure 4:
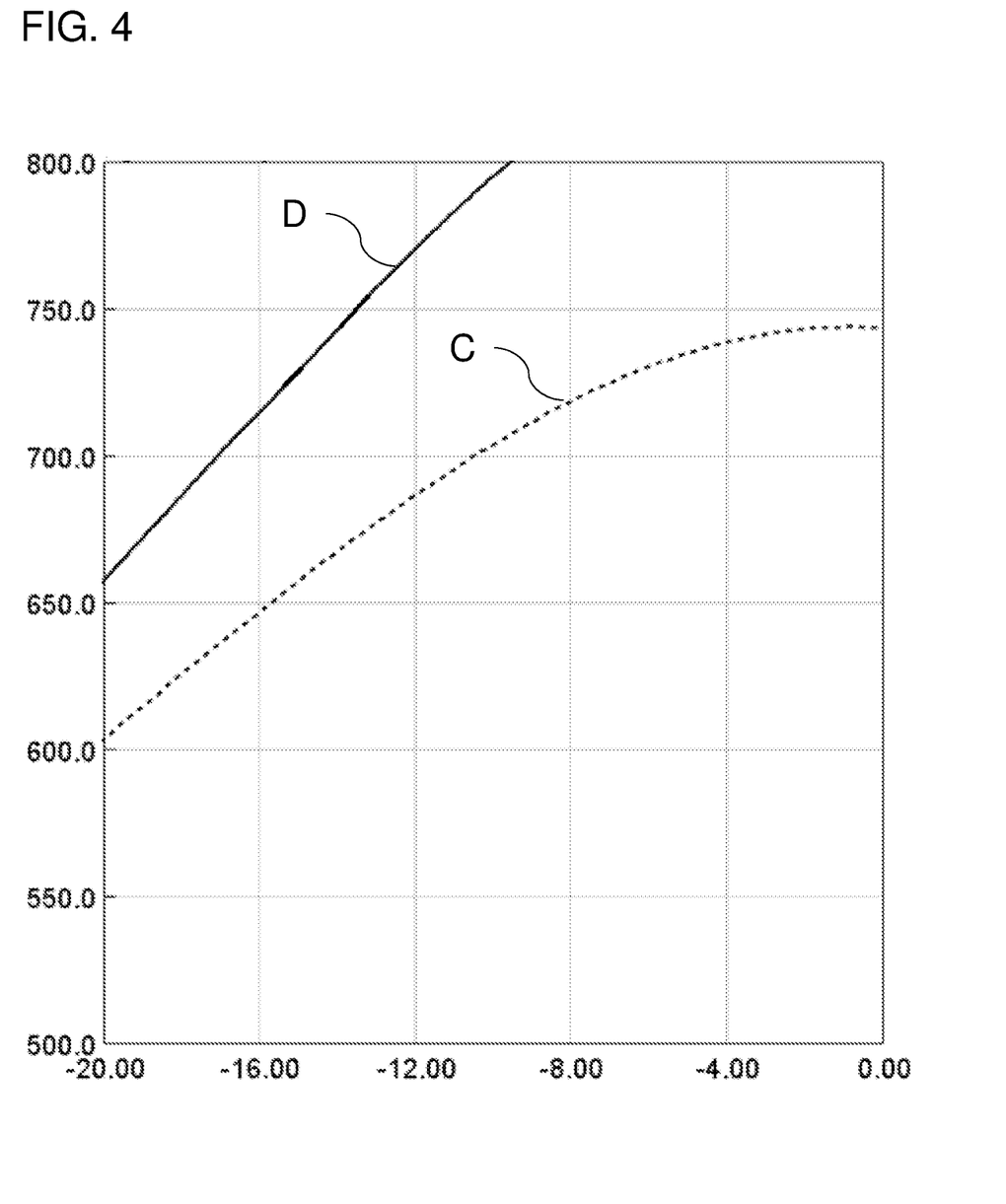
FIG. 4 shows a crank angle/temperature diagram for full load and two different compression ratios.

FIG. 4 shows an illustrative crank angle/temperature diagram for the prechamber 22 for two different compression ratios $\varepsilon$ when the internal combustion engine 10 is under full load. The crank angle of the crankshaft 32 is once again shown on the abscissa. The temperature in the prechamber 22 is once again shown on the ordinate.

A first temperature curve C (dashed curve in FIG. 4) is obtained at a compression ratio of $\varepsilon=16$. A second temperature curve D (solid curve in FIG. 4) is obtained at a compression ratio of $\varepsilon=23$. It is obvious that the final compression temperature rises with a higher compression ratio. Furthermore, it can be seen that, at a high compression ratio of ε=23, the ignition temperature of methane can be reached even earlier as compared with idle (see FIG. 3).

Toward the end of the compression cycle, a pilot quantity of gas fuel is fed by the fuel injector 20 into the prechamber 22 at a high pressure, for example being blown in. The pilot quantity is fed in in a range between 40° of crank angle before top dead center and 10° of crank angle before top dead center. The comparatively early injection of the pilot quantity permits good mixing of gas fuel and inflowing air in the prechamber 22. The pilot quantity is very small. For example, only 0.5 mg to 3 mg of gas fuel is injected into the prechamber as a pilot quantity. The feed duration for the pilot quantity is in this case very short, e.g. just 50 µs to 200 µs. The pilot quantity is selected in such a way that a combustible gas fuel/air mixture is formed in the prechamber 22, e.g. with a combustion air ratio of λ=0.6 to 1.6.

Owing to the high temperature prevailing in the prechamber 22 (see FIGS. 3 and 4), the gas fuel/air mixture autoignites. After the ignition temperature of the gas fuel has been reached, an exothermic combustion reaction takes place in the prechamber 22. The pressure and the temperature in the prechamber 22 increase. Hot gas is forced out of the prechamber 22, through the through openings, into the main combustion chamber 16.

A main quantity of gas fuel is then fed into the prechamber 22 by the fuel injector 20. The main quantity of the gas fuel is fed into the prechamber 22 in a range between 10° of crank angle before top dead center and 25° of crank angle after top dead center, for example. The gas fuel can be fed in continuously over a crank angle range of around 25°. The gas fuel of the main quantity is ignited by the hot gas in and around the prechamber 22. Combustion similar to the HPDI method and the diesel principle takes place in the main combustion chamber 16 in the power cycle or expansion cycle of the internal combustion engine 10.

It is possible that, under cold-start conditions of the internal combustion engine 10, assisted autoignition or applied ignition of the gas fuel will be effected. Autoignition of the pilot quantity can be assisted, for example, by a glow plug which projects into the prechamber 22. It is also possible for applied ignition to be brought about by means of a spark plug projecting into the prechamber. The glow plug or spark plug is for example used only under cold-start conditions of the internal combustion engine 10.

It is also possible for the pilot quantity of gas fuel to be adaptable quantitatively as a function of the boost pressure. Thus, a larger pilot quantity can be fed in in the case of a high boost pressure than in the case of a low boost pressure, for example. The pilot quantity can be adapted or defined in such a way, for example, that a combustion air ratio A of between about 0.5 and about 1.6 is established in the prechamber 22.

The disclosure is not restricted to the preferred exemplary embodiments described above. On the contrary, a large number of variants and modifications that likewise make use of the inventive concept and therefore fall within the scope of protection is possible. In particular, the disclosure also claims protection for the subject matter and the features of the dependent claims independently of the claims to which reference is made. In particular, the individual features of independent claim 1 are each disclosed independently of one another. In addition, the features of the dependent claims are also disclosed independently of all the features of independent claim 1. All range data herein should be interpreted as disclosed in such a way that all the values which fall within the respective range are, as it were, disclosed individually, e.g. also as respective preferred narrower outer limits of the respective range.

We claim:

1. A method for operating an internal combustion engine, comprising:
   compressing supplied air in a main combustion chamber and a prechamber of the internal combustion engine by moving a piston in the main combustion chamber to a top dead center position of a piston movement of the piston;
   feeding a pilot quantity of gas fuel into the prechamber before the piston reaches the top dead center position;
   autoignition of the pilot quantity of gas fuel in the prechamber;
   feeding a main quantity of gas fuel into the prechamber after the autoignition; and
   ignition of the main quantity of gas fuel by the conditions in the prechamber that are brought about by the autoignited pilot quantity.

2. The method as claimed in claim 1, wherein the internal combustion engine is a single-fuel internal combustion engine.

3. The method of claim 2, wherein the gas fuel is methane.

4. The method as claimed in claim 1, wherein:
   compression takes place at a compression ratio greater than or equal to 20, 21, 22 or 23.

5. The method as claimed in claim 1, wherein:
   the pilot quantity results from a pilot mass of gas fuel of between 0.5 mg and 3 mg, preferably between 0.5 mg and 2 mg.

6. The method as claimed in claim 1, wherein:
   the pilot quantity is selected in such a way that a combustion air ratio of between 0.5 and 1.6 is established in the prechamber.

7. The method as claimed in claim 1, wherein:
   the feeding of the pilot quantity is carried out for a period of time of between 50 µs and 200 µs.

8. The method as claimed in claim 1, wherein:
   the feeding of the pilot quantity is carried out in a range between 40° of crank angle before top dead center and 10° of crank angle before top dead center.

9. The method as claimed in claim 1, wherein:
   the feeding of the main quantity is carried out in a range between 10° of crank angle before top dead center and 25° of crank angle after top dead center.

10. The method as claimed in claim 1, wherein:
    the feeding of the pilot quantity and/or the feeding of the main quantity take/takes place with a feed pressure in a range between 200 bar and 600 bar.

11. The method as claimed in claim 1, wherein:
    the feeding of the pilot quantity or the feeding of the main quantity is performed by a piezoelectric fuel injector; or
    the feeding of the pilot quantity or the feeding of the main quantity is performed by a fuel injector actuated by means of an electromagnet.

12. The method as claimed in claim 1, further comprising:
    adapting the pilot quantity or adapting a feed time of the pilot quantity as a function of a boost pressure of the air fed in.

13. The method as claimed in claim 1, wherein:
    an inner side surface of the prechamber has a thermal insulator.

14. The method as claimed in claim 13, wherein the thermal insulator is a thermally insulating coating.

15. The method as claimed in claim 1, wherein:

the step of autoignition of the pilot quantity of gas fuel in the prechamber is carried out during normal operation of the internal combustion engine; and the method further comprises:

applied ignition of the pilot quantity in the prechamber by a spark plug in the case of a cold start of the internal combustion engine; or preheating of the prechamber by means of a glow plug and autoignition of the pilot quantity of gas fuel in the preheated prechamber in the case of a cold start of the internal combustion engine.

16. The method as claimed in claim 1, wherein:
the feeding of the pilot quantity or the feeding of the main quantity takes place in gaseous form; or
the feeding of the pilot quantity and the feeding of the main quantity are performed by the same fuel injector.

17. The method as claim 1, wherein:
the prechamber has a volume in a range between 0.5 cm$^3$ and 2 cm$^3$; or
the prechamber is connected to the main combustion chamber by a plurality of through openings, preferably 6 to 14 distributed through openings; or
the prechamber is integrated into a fuel injector for the pilot quantity or the main quantity, or the prechamber is formed separately from a fuel injector for the pilot quantity and/or the main quantity.

18. An internal combustion engine configured to perform the steps of:

compressing supplied air in a main combustion chamber and a prechamber of the internal combustion engine by moving a piston in the main combustion chamber to a top dead center position of a piston movement of the piston;

feeding a pilot quantity of gas fuel into the prechamber before the piston reaches the top dead center position;

autoignition of the pilot quantity of gas fuel in the prechamber;

feeding a main quantity of gas fuel into the prechamber after the autoignition; and ignition of the main quantity of gas fuel by the conditions in the prechamber that are brought about by the autoignited pilot quantity.

19. A motor vehicle comprising:

an internal combustion engine, wherein the internal combustion engine is configured to perform steps of:

compressing supplied air in a main combustion chamber and a prechamber of the internal combustion engine by moving a piston in the main combustion chamber to a top dead center position of a piston movement of the piston;

feeding a pilot quantity of gas fuel into the prechamber before the piston reaches the top dead center position;

autoignition of the pilot quantity of gas fuel in the prechamber;

feeding a main quantity of gas fuel into the prechamber after the autoignition; and ignition of the main quantity of gas fuel by the conditions in the prechamber that are brought about by the autoignited pilot quantity.

20. The motor vehicle of claim 19, wherein the motor vehicle is a commercial vehicle.

* * * * *